United States Patent
Chapin

[15] 3,698,195
[45] Oct. 17, 1972

[54] WATER DISTRIBUTING HOSE

[72] Inventor: Richard D. Chapin, 368 North Colorado Avenue, Watertown, N.Y. 13601

[22] Filed: May 25, 1970

[21] Appl. No.: 40,138

[52] U.S. Cl. ..................61/12, 138/114, 239/145, 239/542, 239/558
[51] Int. Cl. ..........................E02b 13/00, A01g 25/02
[58] Field of Search..............61/12, 13, 10, 11, 72.1; 239/11, 41, 42, 450, 145, 542, 558; 138/114, 115, 111, 112

[56] References Cited

UNITED STATES PATENTS

| | | | |
|---|---|---|---|
| 3,426,544 | 2/1969 | Curtis | 61/13 |
| 1,761,281 | 6/1930 | Taub | 138/114 |
| 3,080,124 | 3/1963 | Rathmann | 61/12 X |
| 3,302,408 | 2/1967 | Schmid | 61/13 |

Primary Examiner—Jacob Shapiro
Attorney—Clarence A. O'Brien and Harvey B. Jacobson

[57] ABSTRACT

A water distributing hose for use in trickle irrigation comprising an outer tubular wall and an inner wall spaced interiorly from the outer wall and defining an inner tubular member fixed to the outer tubular wall for generally line contact therewith along the full length thereof. Both walls are perforated, normally in opposed relation to the line contact therebetween with the outer wall having a substantially greater number of openings. The inner tube functions so as to carry water along the full length of the hose and maintain, to a substantial degree, the pressure thereof. The water discharges through the inner wall openings and subsequently flows to and through the outer wall openings immediately adjacent to each inner wall opening for a trickle-like discharge therefrom.

18 Claims, 8 Drawing Figures

PATENTED OCT 17 1972

Richard D. Chapin
INVENTOR.

BY Clarence A. O'Brien
and Harvey B. Jacobson
Attorneys

PATENTED OCT 17 1972

Richard D. Chapin
INVENTOR.

BY *Clarence A. O'Brien*
and *Harvey B. Jacobson*
Attorneys

WATER DISTRIBUTING HOSE

The invention herein relates to irrigation systems particularly adapted for the surface or subsurface watering of long runs of crops, whether on greenhouse benches or in the field, and more specifically relates to a trickle irrigation system wherein the water is allowed to discharge slowly directly at the desired point of application, normally about the base of the plants.

It has long been recognized that an efficient means is needed for applying water to crops, particularly field crops, at or below surface level. Since at least as early as 1911 attempts have been made to solve the problems associated with the efficient distribution of water at or below soil level in view of, among other advantages, the substantial saving in water which can be achieved as compared to the conventional overhead sprinkling systems. As an example, in row crops it is only necessary to irrigate the rows and not the entire field. Such a limiting of the watering to the rows could effect a water saving of approximately 40 to 50 percent. This in turn, as the need for food for the world's expanding population increases and the water shortages become more acute, will become increasingly more important.

In this connection, trickle irrigation is especially significant in that the intention thereof is to deliver water at or below the surface and provide for a conservation of water due to a selected distribution thereof. However, to be practical, trickle irrigation must provide for the delivery of water at a slow uniform rate over long runs. In the past, various trickle irrigation systems have been tried, including pipes with small holes, pipes with various types of small outlet members, pipes with small tubes for outlets, plastic pipes with slits, tubes which ooze water through the wall, and hoses which ooze water through a sewn seam. Each type has depended on a small orifice, low pressure, friction created in a long outlet member such as a tube, or a combination of these to limit the individual outlet flow. However, the disadvantages associated with the known systems makes such systems relatively impractical. For example, the use of extremely small orifices such as holes, slits, or the like, tend to clog easily. Tube outlets and special outlet members are relatively expensive to produce and ship, particularly when considering the large quantities required. In addition, low pressure systems and tubes which provide for an oozing of the water through the wall are not capable of producing a uniform flow along the length of the hose or the like, particularly on sloping runs.

It is a primary object of the instant invention to provide a trickle system which is practical in operation and avoids the above noted disadvantages associated with the systems heretofore tried. This is basically effected by using reasonably large outlet orifices so as to prevent clogging from impurities, a high pressure within an internal tube so as to permit use on sloping lands and over long runs without an undesirable decrease in pressure at the far reaches thereof, and a low pressure within the outer wall of the hose so as to enable a slow flow, trickle or drip therefrom as desired for the purpose of properly distributing the water directly at the base of the plants.

Related advantages and objects include the provision of a system which can be inexpensively produced, such being essential due to the vast quantities of hose needed to irrigate typical field crop installations which could involve thousands of acres. The system is compact, the hose capable of being flattened and rolled, thereby simplifying the handling, storage, shipping, installation and removal. The hose used is of a highly durable nature wherein the outer wall protects the inner wall which is to receive and contain the high pressure water. In addition, large areas can be simultaneously watered without requiring excessive high pressures or large volumes of water with the distribution of the water being uniform over extremely long lengths as well as on sloping layouts and in both surface and subsurface installations.

In achieving these objects, the hose of the instant invention, preferably of a thin water-impervious plastic sheet-like material, generally polyethylene, includes an inner tube defining wall which is utilized to move the water, at a relatively high pressure, along the full length of the hose for discharge initially out of the inner tubular member through a series of spaced apertures, and subsequently out of the hose itself through a larger number of apertures or orifices. The pressure flow between the inner and outer hose walls is such so as to restrict the flow of water therebetween so as to discharge through the outer wall orifices closest to the corresponding inner wall orifices whereby little or no longitudinal flow exists within the outer wall. In this manner, an even distribution from the holes in conjunction with a slow discharge is achieved. The inner tubular member is secured in line contact to the outer wall in a position whereby movement thereof will not close or overlie the outer wall orifices. The hose is, in its entirety, collapsible to a flat position for an easy rolling and storage thereof. Further, as a variation, a second inner wall can be provided for a slower ultimate discharge or for an accommodation of longer runs or greater slopes.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
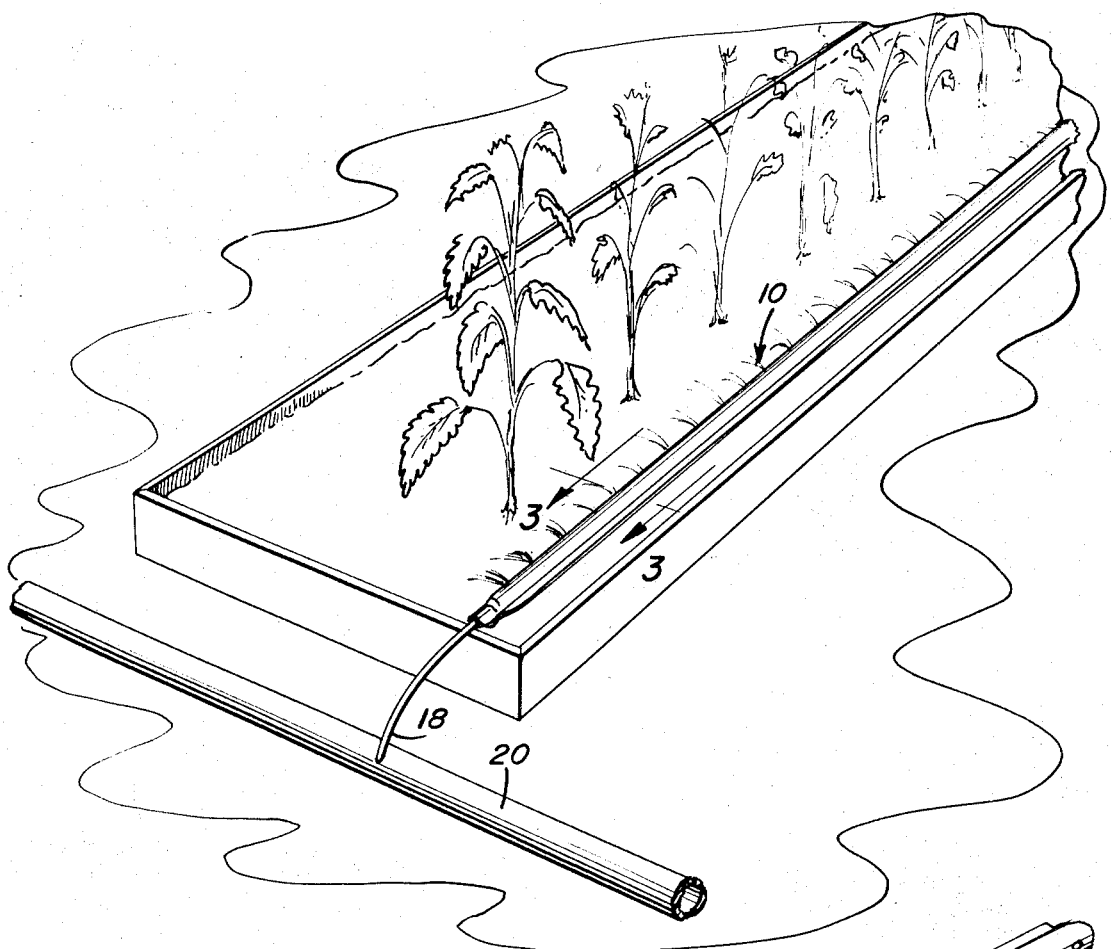
FIG. 1 is a perspective view illustrating a typical installation.
Figure 2:
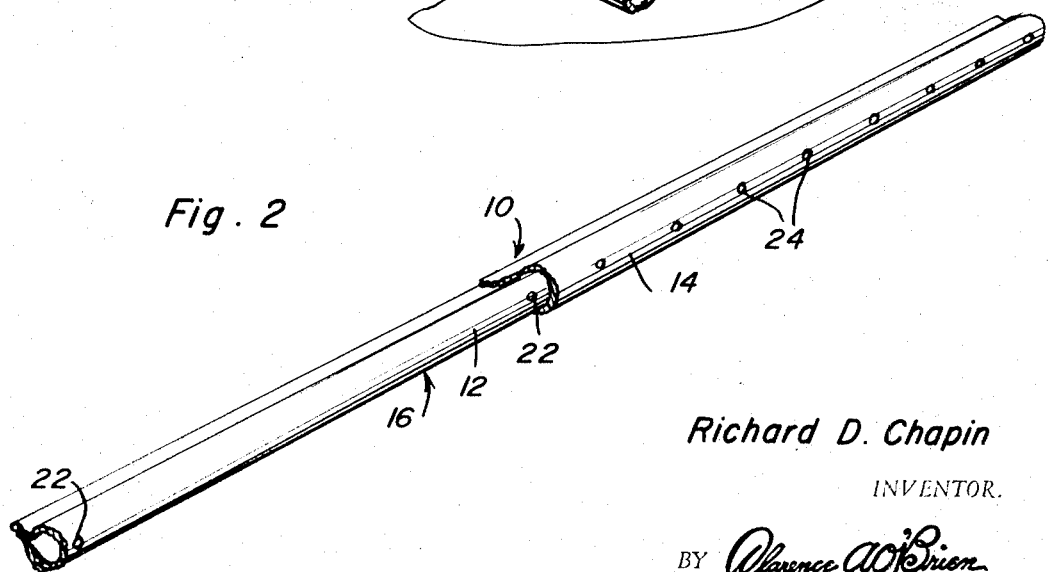
FIG. 2 is a perspective view, with portions broken away, of the water distributing hose of the instant invention.

Referring now more specifically to the drawings, reference numeral 10 is used to generally designate the water distributing hose comprising the instant invention. This hose 10 includes inner and outer walls 12 and 14 configured so as to form an inner tubular member 16 surrounded by the outwardly spaced outer wall 14, defining in effect a pair of generally concentric tubular passages.

Figure 3:
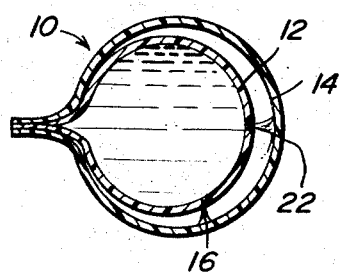
FIG. 3 is an enlarged cross-sectional view through the hose of the instant invention.
Figure 4:
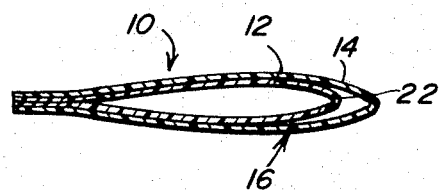
FIG. 4 is a cross-sectional view illustrating the hose in the collapsed condition thereof.
Figure 6:
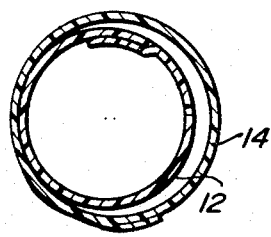
FIG. 6 is an enlarged cross-sectional view through another variation of the hose.

The inner tubular member 16 is anchored to the surrounding wall 14 longitudinally therealong with the engagement of the inner tubular member 16 with the surrounding outer wall 14 being approximately linear. The hose 10, and more specifically the inner and outer walls 12 and 14 thereof, will normally be formed of an appropriate water-impervious flexible material, such as polyethylene, with the preferred manner of constructing the hose comprising utilizing a pair of elongated flat sheets folded over the longitudinal centerlines thereof and heat sealed along the overlapped free edges. Noting FIGS. 3 and 4 in particular, it will be appreciated that all four sheet edges can be commonly sealed so as to not only define the inner and outer tubular members, but also provide for the aforementioned securing of the inner tubular member 16 to the surrounding outer wall 14 linearly therealong. The sheet used to define the inner wall 12 will of course be narrower than the sheet used in the formation of the outer wall 14 so as to achieve the desired difference in the diameters of the tubular members and the resultant surrounding space therebetween. If so desired, the tubular members can be individually formed, as suggested in FIG. 6, with the free ends of each tubular member overlapping and being heat or otherwise sealed to each other. Such a construction would require a separate step to internally seal the inner tubular member linearly along the outer tubular member. With either construction, it will be appreciated that, through the flexible nature of the material utilized, the hose 16, and the tubular members thereof, will assume a substantially cylindrical configuration, as shown in FIGS. 3 and 6, during the water transmitting use thereof, and will collapse flatly, as shown in FIG. 4, upon the release of the internal water pressure whereby an easy rolling of the hose 10 for storage or moving purposes can be effected.

The inner tubular member 16 is to be communicated with a source of pressurized water. This can be effected, as an example, by utilizing one or more supply or inlet tubes 18 extending from an appropriate main 20 into sealed engagement with the inner tubular member 16, normally at one end thereof. Such an arrangement has been generally illustrated in FIG. 1 wherein the hose 10 is illustrated on a greenhouse bench. It will be appreciated that such an arrangement is also equally adaptable for use in conjunction with field crops.

The inner wall 12, or inner tubular member 16 defined thereby, is provided with a series of water passing openings or orifices 22 therein, normally spaced several feet apart. The outer wall 14 also is provided with equally spaced orifices 24, these orifices 24 having a substantially lesser spacing therebetween than the inner orifices 22. In actual practice the spacing of the outer orifices 24 can vary from 1 or 2 inches up to 3 or 4 feet depending on the spacing of the plants being watered and the makeup of the soil. It is contemplated that the number of outlet orifices 22 in the inner wall 12 be approximately 5 to 20 percent of the number of orifices 24 in the outer wall.

The orifices 22 and 24 are to be of a relatively large size, on the order of 0.025 inch, to preclude the possibility of clogging due to impurities in the water supply. Further, both sets of orifices are to be formed in the inner and outer walls 12 and 14 in substantially diametrically opposed relation to the point of linear engagement between the walls so as to preclude any possibility of movement of the inner wall 12 or tubular member 16 in a manner so as to seal off either set of orifices 22 or 24. This is particularly important in ensuring a uniform flow and discharge of water along the hose 10.

In use, water, normally under a pressure of 10 to 15 psi, is introduced into the water passage defined by the inner tubular member 16. This water passage in the inner tubular member 16 is of a cross-sectional size constituting a major portion of the interior cross-section of outer tubular member defined by the outer wall 14 and provides for a maximum flow of the water with a minimum friction loss. Upon a filling of the inner water passage, the water, along the length of the inner tubular member 16, flows through the inner orifices 22 at approximately an equal rate along the length of the hose 10. The water then moves from each inner orifice 22 along the outer flow passage, defined between the inner and outer walls 12 and 14, to the outer orifices 24 in the immediate vicinity thereof for a slow drip, trickle or oozing discharge therefrom. In constructing the hose 10, the outer flow passage is of a relatively small volumetric size as compared to the inner flow passage so as to produce sufficient friction to the flow of water whereby a major portion of the water flowing through each of the inner orifices 22 will tend to flow out of the outer orifices 24 in the immediate vicinity of the inner orifice 22. This vicinity will normally consist of a length half-way to the adjacent inner orifices 22. In this manner, there will be a minimum flow of water along the outer passage, thereby tending to cause a uniform flow or discharge of water out of the orifices 24 along the length of the hose 10. In other words, ideally the outer fluid passage geometry should be optimized to minimize the viscous friction pressure loss in any one outer fluid passage section, defined between the midpoints of the spaces between adjacent inner orifices 22, and yet substantially eliminate fluid flow between any two adjacent outer fluid passage sections, even should a static fluid pressure head exist because of a sloping passage between any two outer sections.

In a typical installation, a hose 330 feet long was constructed utilizing wall thicknesses of 0.008 inch for the inner and outer walls. The inner tubular member had an inside diameter of 0.570 inch and the outer tubular member or surrounding outer wall had an inside diameter of 0.660 inch. The orifices in the inner wall were 0.025 inch and spaced 12 feet apart while the outer wall orifices were 0.025 inch and on 18 inch spacings. Water was supplied at one end of the hose, and more particularly the inner tubular water passage, at 10 psi. The flow from the outer wall orifices was 0.37 gallon per minute per 100 feet of hose, and the flow at the far end of the hose was only 9.8 per cent less than at the supply end. This variation is insignificant when considering the length of the hose, and results in an efficiency heretofore not available, particularly when considering that only an initial pressure of from 10 to 15 psi is utilized and the hose itself is formed of inexpensive hose material consisting of formed sheets of thin flexible polyethylene. This efficiency is achieved essentially through the use of an inner tube which provides for an equal distribution of the higher pressure water along the full length of the hose with the relationship between the inner and outer formed fluid passages being such so as to result in a slow trickle-like discharge of the water from the hose, notwithstanding the high pressure maintained within the internal fluid passage along the full length of the hose. It will be appreciated that the limited discharge from the inner tubular member 16, in conjunction with the relatively large fluid passage provided therein, enables a maintenance of the desired high pressure along the length of the hose. This in turn is very significant in that it enables an accommodation of the trickle system of the instant invention to sloping installations, as are frequently encountered under field conditions, without any significant pressure drops such as might affect the uniform flow from the hose. The pressure required in the outer flow passage so as to achieve the desired slow discharge through the outer orifices is approximately one half psi or less. This combination of features enables the watering of large areas using a low volume of water and a water pressure no greater than that commonly available in household water supplies.

As a point of interest, it has been found that in level bench or field installations, pressure as low as 2 to 3 psi can be used in the inner flow passage while still maintaining the desired outer passage discharge pressure of approximately one half psi or less along a hose of a substantial length, providing a minimum pressure ratio of 4 to 1. Thus, substantially greater areas can be watered from a given water supply than with conventional systems.

Figure 5:
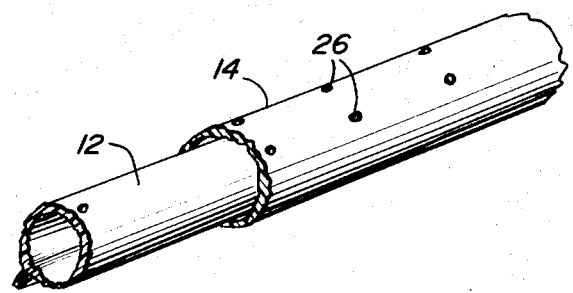
FIG. 5 is a perspective view, with portions broken away, of a variation of the basic hose.

With reference to FIG. 5, it will be noted that the outer wall 14 can be provided with more than one row of orifices 26 so as to increase the coverage. Such orifices 26, however, should also be so positioned relative to the point of secure engagement between the inner and outer walls 12 and 14 as to preclude a movement of the inner wall 12 so as to overlie or close the orifices 26.

Figure 7:
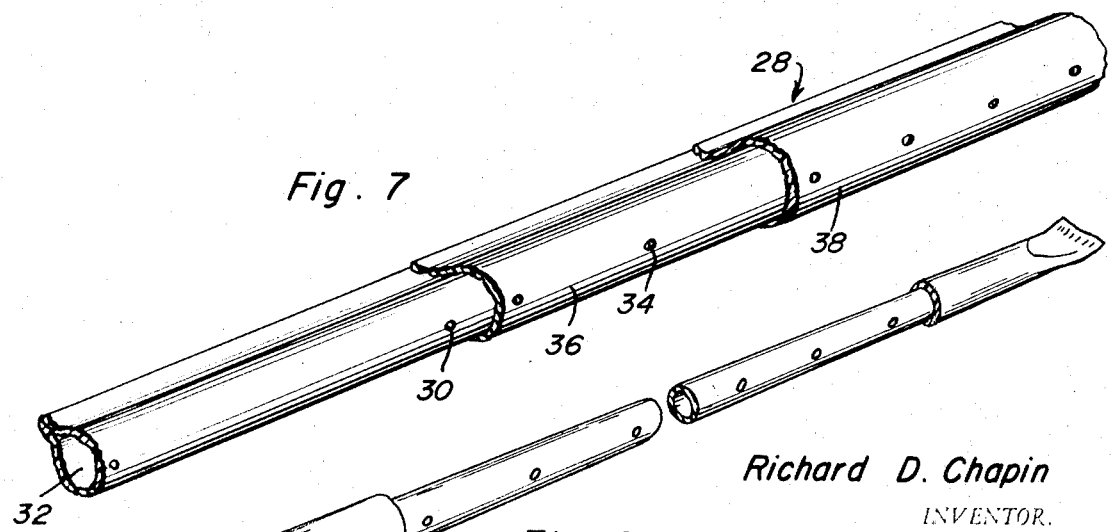
FIG. 7 is a partial perspective view, with portions broken away, of a third variation of the basic hose.

FIG. 7 illustrates a triple wall hose 28 so as to provide for a slower flow using the same pressure within the inner flow passage, and/or greater lengths of runs and uniform flows over greater slopes. As an example, the innermost orifices 30 can be spaced between 30 and 40 feet apart with an internal pressure of 15 to 20 psi in the inner flow passage 32. The orifices 34 in the middle wall 36 can be at 12 foot spacings and those in the outer wall 38 at 18 inch spacings, thus resulting in the ultimately desired extremely slow flow discharge. As will be appreciated, the triple wall hose of FIG. 7 is so constructed as to have the three formed tubular members linearly secured to each other so as to avoid a free floating of the inner tubular members and a tendency for these tubular members to close off the orifices and interrupt the essential uniform discharge along the length of the hose.

Figure 8:
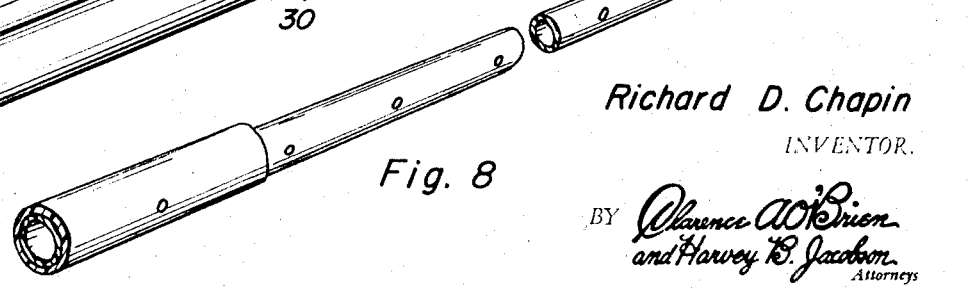
FIG. 8 schematically illustrates orientating the inner holes progressively closer to each other toward the remote end of the hose to equalize the pressure.

While not specifically referred to supra, it will be appreciated that the extreme ends of the hose, regardless of the particular variation thereof utilized, will be sealed aside from the point of communication with the water supply. Further, if deemed necessary to equalize the pressure at and flow from the remote portions of the inner passage, the inner orifices can be progressively closer to each other toward the remote end of the hose as suggested in FIG. 8.

From the foregoing, it will be appreciated that a highly unique water distributing hose has been defined. This hose enables the construction of a trickle irrigation system which is extremely inexpensive while at the same time capable of effectively watering large areas with readily available water pressures and in a manner whereby an essential uniform watering is achieved. This desired uniform watering results notwithstanding sloping ground conditions and the like. The pressure is maintained throughout the length of the tube without requiring the use of extremely small orifices such as easily clog from impurities, reliance instead being had on a particular arrangement of inner and outer fluid passages which enable a maintaining of the relatively high pressure throughout the length of the tube and the reduction of this pressure directly at the point of discharge through the passing of the water from the high pressure inner chamber to the relatively smaller outer fluid passage. It will also be appreciated that the positioning of the high pressure tubular member 16 completely within the outer wall 14 afford a substantial degree of protection for this member against wear, tearing, and the like such as might affect its pressure carrying capacity.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. For use in a fluid distributing system for plants and the like, an elongated distributing hose, said hose including two tubular fluid passages extending longitudinally with one tubular fluid passage maintaining a higher pressure and the second tubular fluid passage maintaining a lower pressure, a wall member separating said tubular fluid passages, said higher pressure passage being adapted for communication with a source of pressurized fluid, fluid passing openings from the higher pressure tubular fluid passage through the wall member into the lower pressure tubular fluid passage and discharge fluid passing openings through a wall of the lower pressure tubular fluid passage to the exterior of the hose, the total area of the discharge fluid passing openings through the wall of the lower pressure tubular fluid passage to the exterior of the hose being substantially greater than the total area of the fluid passing openings from the higher pressure tubular fluid passage, the relationship of the total area of the fluid passing openings in the wall member to the total area of the discharge fluid passing openings in the wall of the lower pressure tubular fluid passage being such as to develop a pressure ratio equivalent to a ratio of 2 p.s.i. in the higher pressure tubular fluid passage to one half p.s.i. or less in the lower pressure tubular fluid passage.

2. The hose of claim 1 wherein the lower pressure fluid passage is substantially smaller than the higher pressure passage and of a size so as to frictionally restrict the fluid being discharged through the fluid passing openings in the wall member for subsequent discharge through the discharge fluid passing openings in the lower pressure fluid passage closest to the fluid passing openings in the wall member.

3. The hose of claim 1 wherein the fluid passing openings in the wall member are progressively closer to each other toward the remote end of the hose.

4. The hose in claim 1 wherein said higher and lower pressure tubular fluid passages are formed of a flexible sheet-like generally fluid impervious material having uninterrupted surfaces, said passages having projection-free interiors and being collapsible from a substantially cylindrical in use configuration to a flat stored configuration.

5. The hose of claim 1 wherein said lower pressure fluid passage surrounds said higher pressure tubular fluid passage, said lower pressure tubular fluid passage being defined by an outer wall encircling said wall member.

6. The hose of claim 5 wherein said wall member is fixed to said outer wall along a linear area of engagement for the length of said hose, said linear area of engagement precluding engagement between the opposed areas of said wall member and outer wall.

7. The hose of claim 6 wherein both sets of fluid passing openings are orientated in generally opposed relation to the linear area of engagement between the wall member and outer wall.

8. The hose of claim 1 wherein said lower pressure tubular fluid passage forms a continuous fluid path extending substantially the length of said hose.

9. For use in a fluid distributing system for plants and the like, an elongated distributing hose, said hose including an inner wall defining an inner tubular fluid passage forming member, and a second wall surrounding and enclosing said inner wall in generally spaced relation thereto, said inner wall being engaged with said second wall along a single linear portion thereof, said second wall being positioned in closely spaced relation to said inner wall so as to define a relatively narrow second fluid passage as compared to that defined by said inner tubular member, said walls having surfaces defining a second fluid passage free of internal projections to enable a complete collapsing of the hose from a substantially cylindrical configuration to a flat configuration, said hose, and the walls thereof, being flexible whereby a rolling of the flat hose can be effected, a plurality of fluid passing openings through said inner and second walls, a third wall surrounding and enclosing said second wall in generally spaced relation thereto, said third wall being engaged with said second wall along a single linear portion thereof, said third wall being positioned in closely spaced relation to said second wall so as to define a relatively narrow third fluid passage, said third fluid passage being free of internal projections to enable a complete collapsing of the hose from a substantially cylindrical configuration to a flat configuration, said third wall being flexible in the manner of said inner and second walls, and a series of fluid passing openings defined in said third wall, the spacing of the fluid passing openings in the third wall being substantially less than the spacing of the fluid passing openings in said second wall.

10. For use in a fluid distributing system for plants and the like, an elongated distributing hose, said hose including two tubular fluid passages with one tubular fluid passage maintaining a higher pressure and the second tubular fluid passage maintaining a lower pressure, a wall member separating said tubular fluid passages, said higher pressure passage being adapted for communication with a source of pressurized fluid, fluid passing openings defining a total passing opening area from the higher pressure tubular fluid passage through the wall member into the lower pressure tubular fluid passage and fluid discharge passing openings defining a substantially greater total passing opening area through a wall of the lower pressure tubular fluid passage to the exterior of the hose, the area relationship of the fluid passing openings in the wall member to the discharge fluid passing openings in the wall of the lower pressure tubular fluid passage being such so as to develop a minimum pressure ratio of 4 to 1.

11. The hose of claim 10 wherein said lower pressure tubular fluid passage surrounds said higher pressure tubular fluid passage, said lower pressure tubular fluid passage being defined by an outer wall encircling said wall member, said outer wall being positioned in closely spaced relation to said wall member so as to define a relatively narrow fluid passage as compared to that defined by said wall member, said wall member being secured to said outer wall along a single linear area of engagement extending for the length of the hose, both sets of fluid passing openings being orientated in generally opposed relation to the linear area of engagement to preclude a closing of said openings.

12. In fluid distributing system for plants and the like, a source of pressurized fluid, an elongated distributing hose, said hose including a plurality of tubular fluid filled passages extending longitudinally, with one tubular fluid passage being directly communicated with the source of pressurized fluid and maintaining the highest pressure and each additional tubular fluid passage maintaining a lower pressure, each said lower pressure passage having closed ends, each tubular fluid passage being separated from the next lower pressure tubular fluid passage by a wall member, the lowest pressure tubular passage having an exterior wall, each said wall member having a fluid passing openings at spaced intervals therealong resulting in a fluid communication of each tubular fluid passage with the next lower pressure tubular fluid passage, and a plurality of discharge fluid passing openings through the exterior wall of the lowest pressure tubular fluid passage to the exterior of the hose, said lowest pressure tubular fluid passage forming a continuous fluid path extending substantially the length of said hose, the total area of the fluid passing openings through the wall member separating each tubular fluid passage from the next lower pressure tubular fluid passage being substantially less than the total area of the fluid passing openings of said next lower pressure tubular fluid passage whereby a substantial pressure differential is developed between each said tubular fluid passage and next lower pressure tubular fluid passage.

13. The system of claim 12 wherein the exterior wall fluid passing openings are presized and free of obstruction to direct passage of fluid therethrough.

14. The system of claim 13 wherein each lower pressure fluid passage is of a size so as to frictionally restrict the fluid being discharged through the fluid passing openings in the wall member adjacent the next higher pressure fluid passage for subsequent discharge through the discharge fluid passing openings in the lower pressure fluid passage closest to the fluid passing openings in said wall member.

15. The system of claim 14 wherein each lower pressure tubular fluid passage completely surrounds the next higher pressure tubular fluid passage.

16. For use in a fluid distributing system for plants and the like in conjunction with a source of pressurized fluid, an elongated distributing hose, said hose including a plurality of tubular fluid accommodating passages extending longitudinally, with one tubular passage being communicatable with the source of pressurized fluid for maintaining the highest pressure and each additional tubular fluid accommodating passage adapted to maintain a lower pressure, each tubular passage being separated from the next lower pressure tubular passage by a wall member, the lowest pressure tubular passage having an exterior wall, each said wall member having bluid passing openings at spaced intervals therealong enabling a fluid communication of each tubular passage with the next lower pressure tubular passage, and a plurality of discharge fluid passing openings through the exterior wall of the lowest pressure tubular passage to the exterior of the hose, said lowest pressure tubular passage forming a continuous fluid accommodating path extending substantially the length of said hose, the total area of the fluid passing openings through the wall member separating each tubular passage from the next lower pressure tubular passage being substantially less than the total area of the discharge fluid passing openings of said next lower pressure tubular passage whereby a substantial pressure differential will be developed between each said tubular passage and the next lower pressure tubular passage.

17. The invention of claim 16 wherein all of the fluid passing openings in the wall member separating the highest pressure tubular passage from the next lower pressure tubular passage are of substantially the same size.

18. The invention of claim 17 wherein the fluid passing openings through the exterior wall are of the order of 0.025 inch.

\* \* \* \* \*